United States Patent
Landes et al.

(10) Patent No.: US 6,854,324 B2
(45) Date of Patent: Feb. 15, 2005

(54) TIRE MONITORING APPARATUS

(75) Inventors: Darrin James Landes, Madison, WI (US); Edward John Demor III, Copley, OH (US); Mathias Robert Labbe, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 59 days.

(21) Appl. No.: 10/324,757

(22) Filed: Dec. 20, 2002

(65) Prior Publication Data

US 2004/0118196 A1 Jun. 24, 2004

(51) Int. Cl.⁷ ............................................. G01M 17/02
(52) U.S. Cl. ..................... 73/146; 73/146.5; 340/442
(58) Field of Search .............................. 73/146, 146.2, 73/146.5; 340/442, 447

(56) References Cited

U.S. PATENT DOCUMENTS

| | | | |
|---|---|---|---|
| 6,082,192 A | 7/2000 | Koch et al. | 73/146.5 |
| 6,087,930 A | 7/2000 | Kulka et al. | 340/447 |
| 6,161,430 A | 12/2000 | Koch et al. | 73/146 |
| 6,255,940 B1 * | 7/2001 | Phelan et al. | 340/447 |
| 6,292,095 B1 | 9/2001 | Fuller et al. | 340/442 |
| 6,386,251 B1 | 5/2002 | Koch et al. | 152/152.1 |
| 6,386,254 B1 | 5/2002 | Koch et al. | 152/216 |
| 6,443,198 B1 | 9/2002 | Koch et al. | 152/152.1 |
| 6,444,069 B1 | 9/2002 | Koch et al. | 156/123 |
| 6,518,877 B1 * | 2/2003 | Starkey et al. | 340/447 |
| 6,581,449 B1 * | 6/2003 | Brown et al. | 73/146 |
| 6,591,671 B2 * | 7/2003 | Brown | 73/146.5 |
| 6,624,748 B1 * | 9/2003 | Phelan et al. | 340/442 |
| 6,683,537 B2 * | 1/2004 | Starkey et al. | 340/870.16 |
| 2002/0029628 A1 | 3/2002 | Koch et al. | 73/147 |
| 2002/0046599 A1 | 4/2002 | Chuang et al. | 73/146 |

FOREIGN PATENT DOCUMENTS

DE 3935298 4/1991 .......... B60C/23/04

* cited by examiner

Primary Examiner—Edward Lefkowitz
Assistant Examiner—Andre Allen
(74) Attorney, Agent, or Firm—Richard B. O'Planick

(57) ABSTRACT

Apparatus for mounting an electronic tag within a tire includes a patch having a first side for mounted location against an inner liner of the tire, a second opposite side, and a socket member extending into the second side. A housing is provided having an internal tag receiving chamber defined by sidewalls and an elongate assembly bolt extends through the housing passageway and into the patch socket member to attach the housing to the patch. A remote end of the assembly bolt protrudes through the patch and carries a temperature sensor that engages the tire inner liner and transmits temperature data to electronic data transmission means within the housing. A lower portion of the housing sidewall is adapted to angle inward toward the lower housing end and a pressure measuring device is mounted within the angled sidewall portion. The housing comprises a cup and a top member, the top member covering the cap and including a dependent skirt portion engaging the patch second surface along a lower edge to seat the housing upon the patch. The cup and top components are preferably formed of a rubber matrix.

19 Claims, 4 Drawing Sheets

TIRE MONITORING APPARATUS

FIELD OF THE INVENTION

This invention relates generally to pressure and temperature measurements of a tire and, more specifically, to apparatus for measuring off-the-road tire temperatures and pressures for diagnosing any impending failure thereof.

BACKGROUND OF THE INVENTION

In order to transport bulk materials, such as coal, iron ore, and other minerals, the mining and other industry uses Off-The-Road (OTR) vehicles that may weigh up to 670 tons when fully loaded. As a result, extremely high internal stresses are imposed on the tires of such vehicles in the course of their daily use. Such internal stresses are proportional to the speed at which the vehicle is driven and excessive speed can result in a destruction of the vehicle tires. Consequently, the speed of an OTR vehicle is controlled on the basis of the operator's perception of the condition of the tires at any given time. Accurate information regarding the tires, particularly its pressure and temperature, is therefore essential in order to assist the operator and avoid damage to an OTR vehicle's tires. It is, therefore, advantageous to provide a tag for measuring OTR vehicle tire pressure and temperature and communicating such information to the operator.

Because of the extremely rigorous operational and environmental conditions in which OTR vehicle's operate, a suitable tag must, in addition to being accurate, be durable and of high structural and operational integrity. In the environment in which the OTR vehicles operate, it is not uncommon for foreign material to invade the tire air cavity. Such material along with anti-corrosive liquid can be abrasive and cause damage to the tag transmitters and contaminate the electronics, leading to premature failure of the tag.

Various attempts have been made to monitor the tire condition in an OTR vehicle and to provide operators with timely information concerning such conditions. For example, U.S. Pat. No. 6,255,940, incorporated herein by reference, teaches apparatus for monitoring tire condition and includes a tag housing and a patch having a first side for mounting against the inner liner of the tire and a second, arcutately-shaped side and an internally threaded socket member. A threaded steel assembly bolt is made to extend from a side of the tag housing and into the threaded socket of the patch. The tag housing includes means for measuring temperature within the tire cavity through measurement of the temperature of the steel assembly bolt. Additionally, pressure is measured by the tag and the temperature and pressure data are transmitted to an external processor and display.

While the apparatus in the aforesaid patent works well and represents an advancement over prior art, the industry remains in need of apparatus for a tire monitoring system of still greater durability and resistance to damage from environmental contaminants. Moreover, still greater accuracy than that achieved heretofore in the measurement of temperature and pressure conditions within an OTR tire is desired. Deducing the temperature of the tire cavity through measurement of the apparatus bolt, as taught in the prior art, is inherently less than precise.

SUMMARY OF THE INVENTION

The present invention addresses the needs of the industry by the provision of apparatus for mounting an electronic tag within a tire. The apparatus includes a patch having a first side for mounted location against an inner liner of the tire, a second opposite side, and a socket member extending into the second side. A housing is provided having an internal tag receiving chamber defined by sidewalls and an elongate assembly bolt formed of thermally non-conductive material extends through the housing passageway and into the patch socket member to attach the housing to the patch. A remote end of the assembly bolt protrudes through the patch and carries a temperature sensor that engages the tire inner liner and relays temperature data to the tag electronics within the housing for transmission to an external reader. A lower portion of the housing sidewall is adapted to angle inward toward the lower housing end and a pressure measuring device is mounted within the angled sidewall portion. The housing comprises a cup and a top member, the top member covering the cap and including a dependent skirt portion engaging the patch second surface along a lower edge to seat the housing upon the patch. The cup and top components are preferably formed of a material impervious to structural degradation over time and the penetration of contaminants or ambient fluids into the housing chamber.

Descriptions

"Bead" generally means an annularly shaped member located within either of the inner radial end portions of a tire.

"Bead Portion" generally means either of the opposed radial inner end portions of the carcass of a tire including a bead, the portion of a ply which is looped about the bead, and the rubber material surrounding the bead and ply portion.

"Carcass" generally means the tire structure including the beads and ply, but excluding the belt structure, undertread over the ply and the tread.

"Equitorial Plane" means the imaginary plane extending perpendicular to the axis of rotation of the tire and passing through the center of the tread; or the plane containing the circumferential centerline of the tread.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
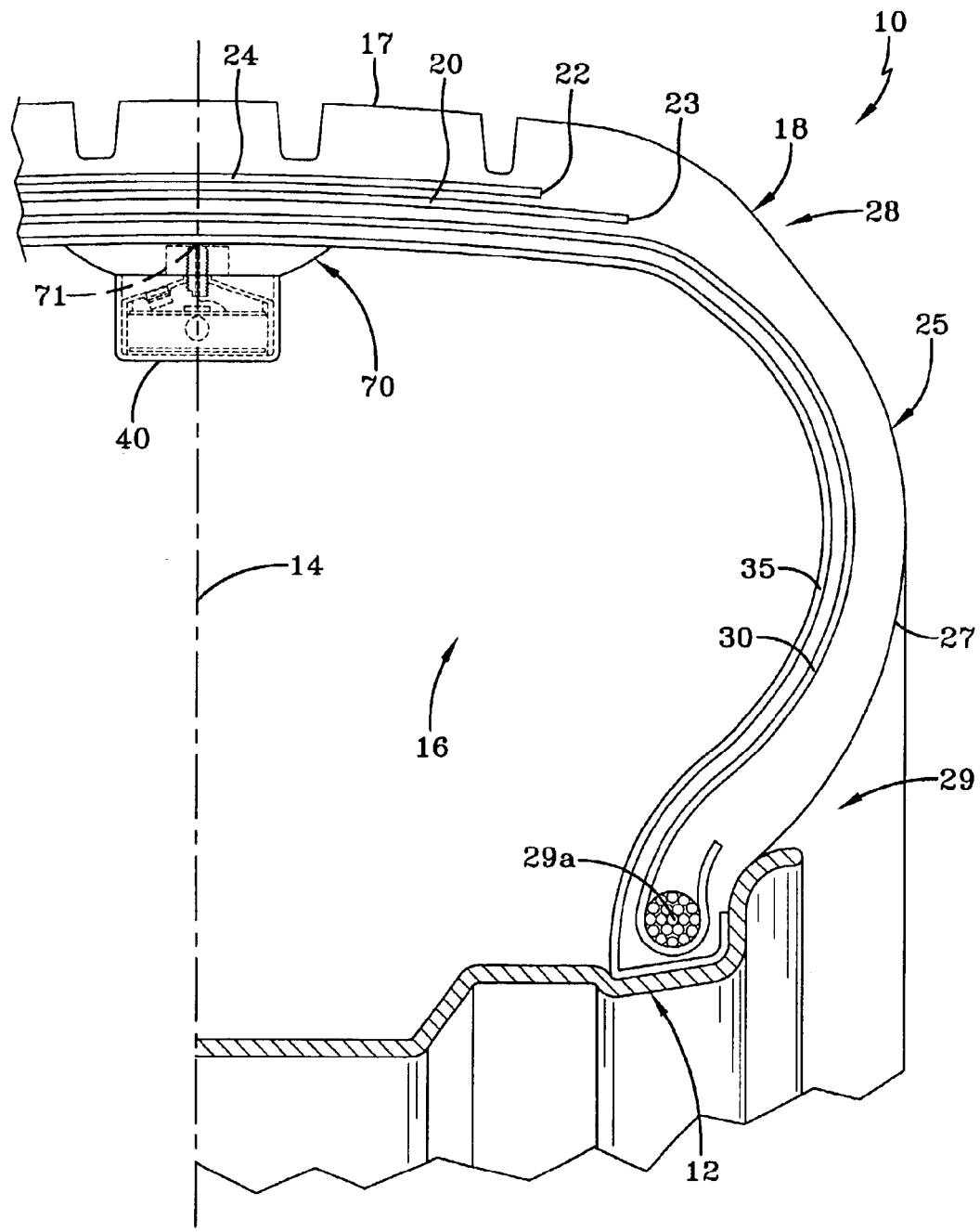
FIG. 1 is a partial, one-half, cross-sectional view of a pneumatic tire having mounted therein an electronic tire tag according to the invention.

FIG. 1 shows half of a partial transverse cross-sectional view of a typical pneumatic tire 10 for an OTR vehicle, mounted on a wheel rim 12 thereof. Since the tire 10 is generally toroidally-shaped and symmetrically arranged with respect to an imaginary equatorial plane 14, the transverse cross-section of the other partial half of the tire 10 includes like or corresponding parts, and it should be understood that the explanation applies to the other half of the tire 10 as well.

The tire 10 has a cavity 16 for receiving pressurized air when the tire 10 is mounted on the wheel rim 12. The tire 10 generally comprises a central tread 17 having opposite sides generally indicated by the numeral 18. In addition, the tire 10 includes a plurality of radially-extending belts 20 and 22 that are centrally disposed radially-inward of the tread 17. The belts 20, 22 have opposite side edges 23, 24, respectively. A carcass 25 is included opposite sidewalls 27 which merge with radially extend inward from opposite tread sides 18 to form therewith opposite shoulder portions generally indicated by numeral 28. The carcass includes opposite bead portions 29 at the radial inner ends thereof. Each of the bead portions 29 includes an annularly-shaped bead 29a therein for urging the bead portions 29 into abutment with the wheel rim 12. Moreover, the carcass 25 includes one or more plies 30 radially disposed inwardly of the belts 20, 22. The ply 30 radially extends between and is looped about the opposed beads 29a. Adjoining the carcass 25 is a radially extending innerliner 35 disposed inward of the ply 30. While the tire 10 is a radial tire, the subject invention can be utilized in biased tires as well.

According to the invention, an electronic tire tag 40 (FIGS. 1 and 2) is preferably fixedly secured to the inner liner 35 of the tire 10 at an area thereof located substantially directly radially inward of a side edge 23 of the belt 20 that is closest to the innerliner 35 of the tire 10 and adjacent to a shoulder portion 28 of the tire 10. Other locations of the tag are also possible in accordance with the invention. Since the tag 40 is preferentially located adjacent an area of the innerliner 35 where the tire 10 is thickest and least able to dissipate heat, the temperature measurements taken at this location are the most closely related to determining whether or not an internal breakdown of the tire 10 is imminent. The breakdown is typically due to internal stresses causing delaminations of the belts 20, 22, ply 30 and surrounding vulcanized rubber material 36 at the shoulder portions 28 of the tire 10.

The electronic tag 40 (FIGS. 1 and 2) generally comprises a micro-controller 42 and a temperature sensing device 44 electrically connected thereto by conductor 46 for sampling the temperature of the innerliner 35 of the tire 10. Further, the tag 40 generally includes pressure sensing structure 48 electrically connected to the micro-controller 42 for sampling the air pressure within the tire 10. The tag 40 further includes a pair of printed circuit boards 50 electrically connected to the microcontroller 42. The boards 50 include a transmitter (not shown) for transmitting relevant information concerning the respective samplings taken by the temperature and pressure sensing devices 44 and 48.

A tag electronically functional and suitable for use in conjunction with the subject invention is as shown in U.S. Pat. No. 6,225,940B, incorporated by reference herein. The tag 40 preferably includes a battery 51 that is conventionally electrically connected to the micro-controller 42 for energization thereof. The pressure sensing device 48 is of a type commercially available. By way of example, without intending to limit the invention, a pressure sensor suitable for use is sold by Measurement Specialties, Inc., 1871 N. Capitol Avenue, San Jose, Calif. 95132 and is commercially designated as Part No. 85-100A-OP. The transmitter structure on boards 50 preferably includes an antenna (not shown).

The tag further includes structure for connecting the tag 40 to the tire 10. The connecting structure preferably includes a bolt 62 and a threaded portion 64 thereof extending from the tag 40. A central axial passageway 66 extends through the bolt 62 from a remote tapered tip 67 to an internal bolt end 68. The tag 40 is preferably entirely encapsulated in an encapsulation material such as a potting epoxy or a mixture of epoxy and glass beads coated with urethane.

The encapsulated tag (FIG. 2) is preferably not directly connected to the innerliner 35 of the tire 10. Rather, a vulcanized rubber patch 70, having embedded therein an internally threaded nut 71, is affixed to the innerliner 35 of the tire 10. In one embodiment, the patch 70 has a lens-shaped transverse cross-section, defined by a substantially flat side 72 having a generally circular perimeter connectable to the innerliner 35. Patch 70 further includes an arcuate shaped inner side 73 disposed on the opposite side of the patch. The arcuate patch side 73 includes a medial portion 74 of substantially planar configuration. Side 72 of the patch 70 is dimensioned for disposition in abutment with the substantially arcuate shaped area of the innerliner 35. Side 73 of the patch 70 faces the interior of the tire 10. The encapsulated tag 40 has a substantially rectangularly shaped transverse cross-section and generally mounts against the substantially straight side 74. The encapsulated tag 40 is connected to the patch 70 by threadably connecting the bolt 62 into the nut 71 of the patch 70.

With reference to FIGS. 1, 2, 3, and 4, the tag 40 includes a housing shell assembly generally indicated by numeral 80. The assembly 80 comprises a top cover member 82 and a bottom cup member 84. Preferably, members 82, 84 are molded separately by conventional means and constructed of a rubber matrix such as butyl rubber. It is common for foreign material and anti-corrosive liquid to invade a tire cavity. Heretofore, such material would migrate into the housing of a conventionally configured tag. Once within the housing, the material would contact transmitters or other electronic components and cause damage and premature failure. The rubber composition used in the creation of members 82, 84 is resilient and less prone to abrasion and cracking, thus making the assembly 80 less susceptible to liquid penetration.

The top cover member 82 is substantially cylindrical and comprises dependent peripheral side walls 86 merging into a top, generally planar, top surface 88. The cup member 84 comprises upstanding peripheral sidewalls 90 and lower sidewall portions 92 that cant inwardly toward a central aperture 94 through a lower end of the cup member 84. Thus, the upper portion of the cup member 84 is substantially cylindrical while the lower portion of cup member 84 is of a generally inverted conical configuration. The sidewalls 90 and lower sidewall portions 92 define an internal upwardly open central chamber 96. Formed to extend into the chamber 96 from the sidewalls 90 are molded shoulders 98. Shoulders 98 serve to support and register the circuit board 50 within the cup chamber 96. The cover member 82 and the cup member 84 are circular in cross-section with the cover member closely fitting over the cup member as seen best from FIG. 2. In the assembled condition, the sidewalls 86 of the cover member 82 are disposed to the outside and closely adjacent the sidewalls 90 of the cup member 84, with the top surface 88 of the cover member 82 enclosing the open side of the internal chamber 96.

Figure 2:
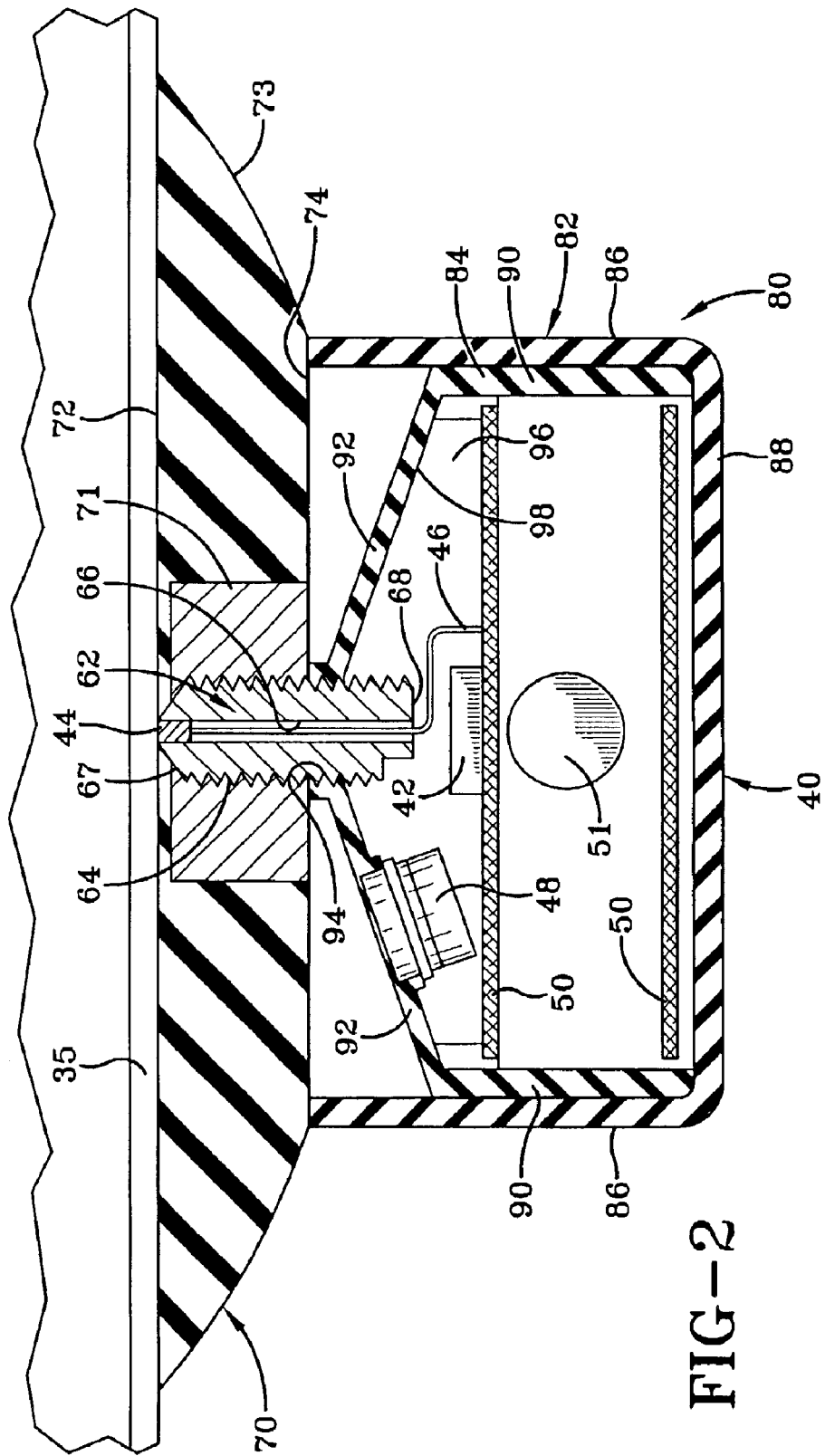
FIG. 2 is an enlarged transverse cross-sectional view of the details of the tag of FIG. 1, showing the encapsulating and mounting structures thereof.
Figure 3:
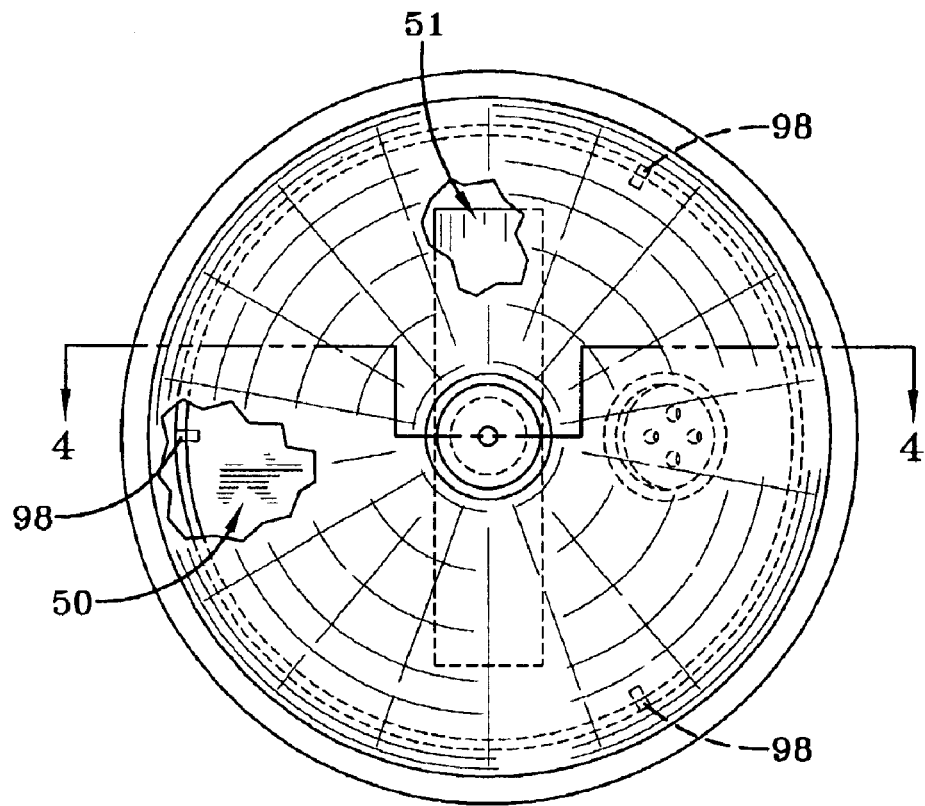
FIG. 3 is top plan view of the apparatus in the assembled condition.
Figure 4:
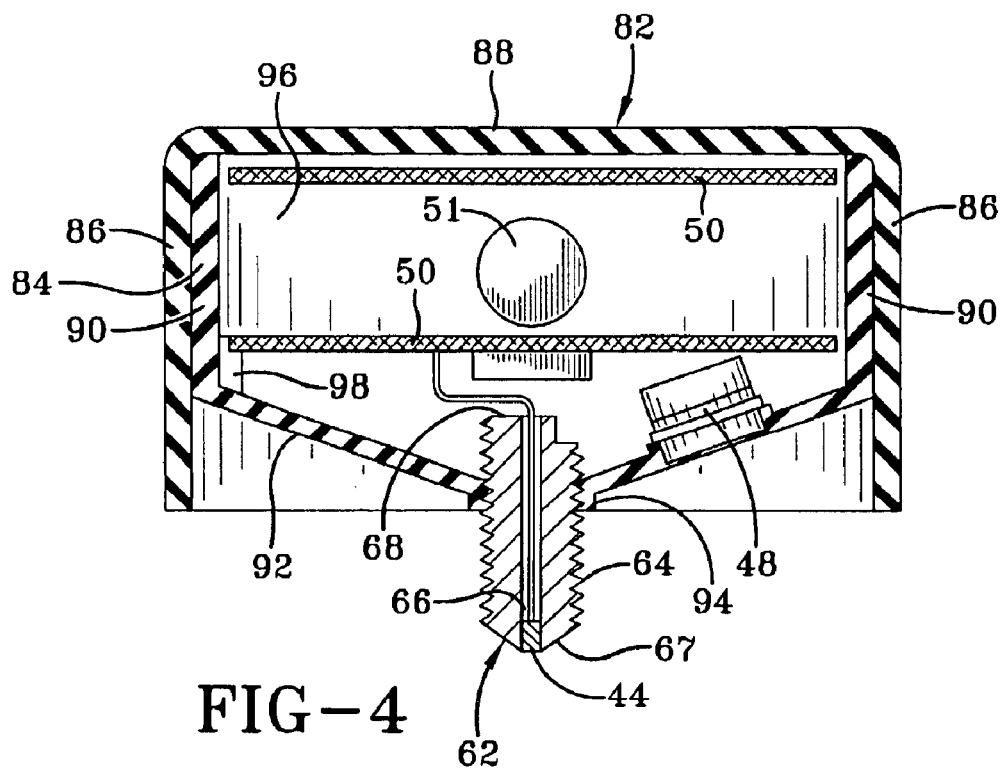
FIG. 4 is a transverse sectional view through the assembled apparatus taken along the line 4—4 of FIG. 3.
Figure 5:
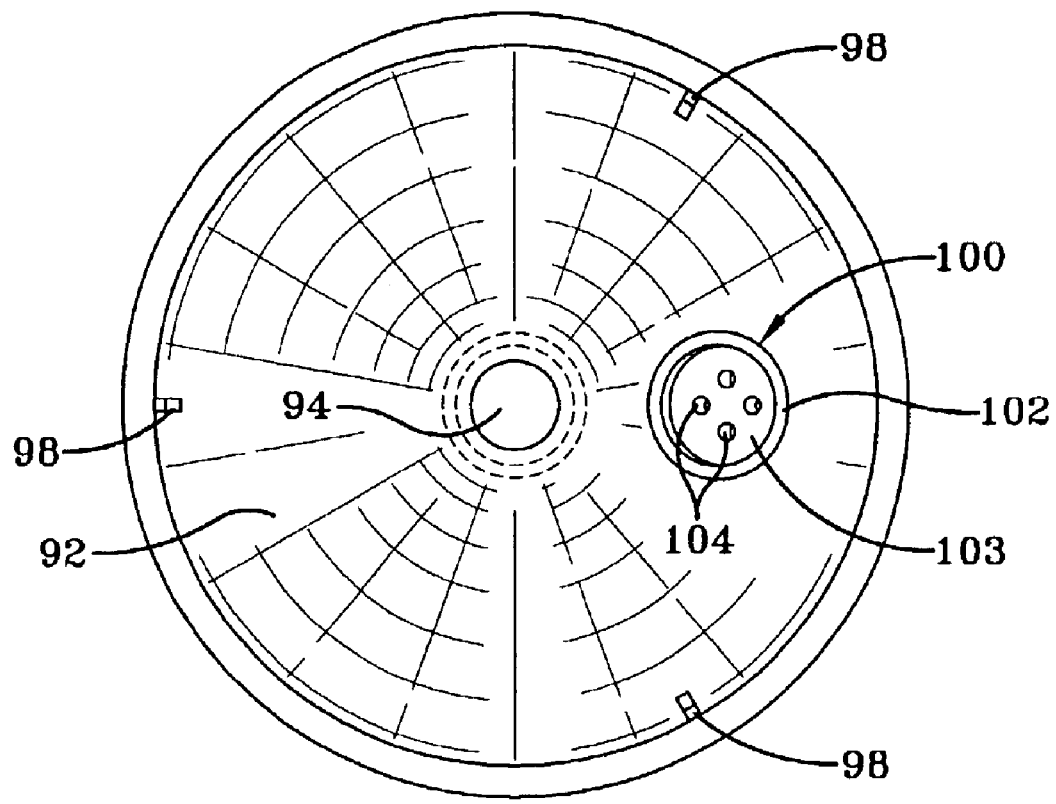
FIG. 5 is a bottom plan view of the cup component of the housing assembly.

With reference to FIGS. 2 and 5, a generally circular socket or well 100 is formed within the canted inward sidewall portions 92 of the cup member 84 dimensioned for close receipt of the pressure sensing device 48. The socket 100 is defined by inwardly extending molded perimeter flange 102 and socket floor 103. At least one, and preferably multiple vent apertures 104 are formed to extend through the socket floor 103. The pressure sensor 48 is seated within the well 100 and is sealed from the environment of the tire to eliminate the chance of contamination from anti-corrosive liquid in the tire cavity. The pressure sensor 48 is mounted within the well 100 such that it is preferably, but not necessarily, against the socket floor 103 and generally flush with the outside of the cup member sidewall portion 92. The vent aperture(s) 104 extend through the socket floor 103 and are relatively small in diameter, for example on the order of 0.05 inch. The apertures 104 allow for accurate pressure sensing by the pressure sensor 48.

The temperature sensor 44 is seated within the axial passageway 66 of the bolt 62 at the bolt tip 67. Without limiting intention, a temperature sensor suitable for incorporation into the subject embodiment is sold by Dallas Semiconductor Corp., 4401 South Beltwood Parkway, Dallas, Tex. 75244 under the part No. DS18820X. The sensor 44 is connected to the electronics on board 50 by means of the conductor 46 extending upwardly through the passageway 66 and exiting from the inward bolt end 68. The bolt 62 is preferably a ½ inch diameter hollow bolt formed of a relatively thermally non-conductive material such as Torlon or nylon. The bolt threaded portion 64 passes through the cup member hole 94 and threadedly engages the nut 71 entrapped within the patch 70. Nut 71 is likewise formed preferably of a relatively thermally non-conductive material such as Torlon or nylon. The thin layer of material in patch 70 beneath the nut 71 is removed to expose an underside of the nut. The bolt portion 64 is of sufficient length to protrude through the nut 71 and exit the underside 72 of the patch 70 in order to allow the tip 67 of the bolt to contact the innerliner 35 of the tire. The bolt 62 is screwed down until it touches or penetrates the innerliner 35 of the tire. The temperature sensor 44, disposed within the tip, likewise physically contacts the tire inner liner. Such contact between the temperature sensor 44 and the tire innerliner 35 greatly increases the validity of the temperature reading. Alternative systems for measuring the temperature of the tire do so in an analogous manner by measuring the air cavity temperature. Such a reading may be significantly different than the actual tire temperature obtained through the practice of the subject invention. The bolt 62, it will be appreciated, thereby achieves the dual purposes of mechanically connecting the housing cup member 84 to the patch 70 and carrying the temperature sensor into direct contacting engagement with the tire innerliner 35 for accurate temperature measurement.

As described above, the cover member 82 and the cup member 84 are separately molded from a rubber based material such as nitrol rubber. After curing, the holes 104 for the pressure sensor 48 and the through hole 94 may be punched in the cup member 84 at the locations indicated. Alternatively, the holes 104 and 94 may be molded in directly with the manufacture of cup member 84. The cup member 84 may then be used as a potting shell in which the electronic components are placed. Specifically, printed circuit board 50 and the electronic components carried thereon are inserted within chamber 96 and placed upon the molded shoulders 98. The pressure sensor 48 is positioned within the socket 100 with electrical connection established between the sensor 48 and the transmitter on board 50. The bolt 62 is likewise located within the chamber 96 with the bolt threaded portion or shaft 64 extending through the housing hole 94 and the patch in the manner described previously. A potting epoxy is then poured into the cup member 84 over the electronic components to secure and protect them.

After the epoxy has cured, a fast-dry rubber cement is added to the outside of the cup member sidewalls 90 and the inside of the top shell sidewalls 86. These surfaces may be molded with a textured finish to increase the adhesion with the rubber cement. Once the cement has dried, a rubber gum strip is wrapped once around the bottom cup member 84 and the top cover member 82 and the two halves are then stitched together to further increase the bond therebetween.

The resultant housing 80, thusly formed and assembled, represents an enclosure relatively impervious to penetrating outside contaminants. The rubber composed top and bottom components 82, 84 can flex with the operation of the OTR vehicle tire without cracking. The electronics contained within the housing 80 are thereby protected. From FIGS. 2 and 4, it will further be appreciated that the placement of the pressure sensor 48 within the canted sidewall portions 92 of the cup member 84 creates an air gap between the sensor 48 and the top surface 74 of the patch 70 post assembly. The air gap so created is exposed to the tire cavity and, through vent apertures 104, allows the pressure sensor to accurately read the cavity air pressure. The bolt shaft portion 64, carrying temperature sensor 44 within tip 67, is in direct contact with the tire liner. Accurate and direct temperature data is thereby facilitated and may be conveyed to the transmitter within the tag shell and transmitted to an external reader. It will also be noted that the bolt 62 and patch nut 71 are formed thermally isolates the temperature sensor 48 and minimizes heat loss from the region of the tire engaged by the sensor 48. Accuracy in the temperature reading is enhanced thereby.

As seen from FIGS. 1 and 2, the lower portion of the cover member sidewalls 86 creates a peripheral skirt surrounding the lower portion of the tag housing 80. The presence of the skirt serves to further protect the pressure sensor 48 mounted within sidewall portion 92. Finally, the subject housing 80 provides with a minimal number of relatively inexpensive to manufacture and assembly components, a method for mounting an electronic tag within an OTR vehicle tire that is durable, resistant to contaminant infiltration, and functionally advantageous in obtaining accurate temperature and pressure data from the tire. Variations in the present invention are possible in light of the description of it provided herein.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Apparatus for mounting an electronic tag within a tire, comprising:
   a patch having a first side for mounting against an inner liner of the tire, a second side opposite the first side, and a socket member extending into the second patch side;
   a housing including an internal tag receiving chamber at least partially defined by opposite sidewalls, a lower housing end adapted for location proximate the patch second side;
   an elongate protruding member extendable through the housing lower end and into the patch socket member, the protruding member including a remote end extending through the patch for engagement with the tire inner liner and wherein the remote end of the protruding member includes a temperature detection device for direct contacting engagement with the tire inner liner.

2. Apparatus according to claim 1, wherein the socket member is internally threaded and the protruding member is externally threaded for threaded engagement with the socket member.

3. Apparatus according to claim 1, wherein the protruding member comprises a mounting bolt having an axial passageway extending between the housing chamber and the remote end.

4. Apparatus according to claim 3, wherein the protruding member is formed of substantially thermally non-conductive material.

5. Apparatus according to claim 4, wherein the protruding member and the patch socket member are composed of substantially similar thermally non-conductive material.

6. Apparatus according to claim 1, wherein the housing sidewalls include at least one inwardly directed lower sidewall portion.

7. Apparatus according to claim 6, wherein the housing includes means for mounting a pressure sensor within the one inwardly directed housing lower sidewall portion.

8. Apparatus according to claim 7, wherein the pressure sensor is mounted substantially flush with an outward surface of the one inwardly directed housing lower sidewall portion.

9. Apparatus according to claim 8, wherein the one inwardly directed housing lower sidewall portion includes at least one air inlet aperture extending there through at a location proximate the pressure sensor and the outer surface of the one inwardly directed housing lower sidewall portion is spaced from the second side of the patch to ensure that the air inlet aperture is open to the tire cavity.

10. Apparatus according to claim 1, wherein the housing is formed of a rubber matrix.

11. Apparatus for mounting an electronic tag within a tire, comprising:
    a patch having a first side for mounting against an inner liner of the tire, a second side opposite the first side, and a socket member extending into the second patch side;
    a housing including an internal tag receiving chamber at least partially defined by opposite sidewalls, a lower housing end adapted for location proximate the patch second side;
    an elongate protruding member extendable through the housing lower end and into the patch socket member, the protruding member including a remote end extending through the patch for engagement with the tire inner liner and
    wherein the housing comprises a cup member and a top member, the top member fitting over the cup member and including dependent peripheral skirt portion having a lower edge for abutting engagement against the patch second side.

12. Apparatus according to claim 11, wherein the housing cup member and top member are formed of a rubber matrix.

13. Apparatus for mounting an electronic tag within a tire, comprising:
    a patch having a first side for mounting against an inner liner of the tire, a second side opposite the first side, and a socket member extending into the second patch side;
    a housing including an internal tag receiving chamber at least partially defined by opposite sidewalls, a lower housing end adapted for location proximate the patch second side;
    an elongate protruding member extendable through the housing lower end and into the patch socket member, the protruding member including a remote end and a temperature detection device disposed at the remote end.

14. Apparatus according to claim 13, wherein the housing is at least partially composed of a rubber matrix material.

15. Apparatus according to claim 13, wherein the protruding member remote end extends from the patch first side for engagement with the tire inner liner.

16. Apparatus according to claim 13, wherein the housing sidewalls include at least one inwardly canted lower sidewall portion and a pressure sensor mounted within the one inward directed housing lower sidewall portion.

17. Apparatus for mounting an electronic tag within a tire cavity, comprising;
    a patch having a first side for mounting against an inner liner of the tire, a second side opposite the first side, and a socket member extending into the second patch side;
    a housing including an internal tag receiving chamber at least partially defined by opposite sidewalls, the housing sidewalls including at least one inwardly canted lower sidewall portion and a pressure sensor mounted at a location within the one inwardly canted housing lower sidewall portion;
    an elongate protruding member extendable through a lower end of the housing and into engagement with the patch socket member to connect the housing to the patch.

18. Apparatus according to claim 17, wherein the location of the pressure sensor in the one inward directed housing lower sidewall portion is spaced a distance from the second side of the patch to ensure exposure of the pressure sensor to the tire cavity.

19. Apparatus according to claim 17, wherein the protruding member includes a remote end extending through the patch and a temperature sensor disposed at the remote end of the protruding member for direct contacting engagement with the tire inner liner.

* * * * *